(No Model.)
W. B. LEARNED & J. A. MOSHER.
CENTER ARBOR FOR WATCHES.
No. 530,345. Patented Dec. 4, 1894.
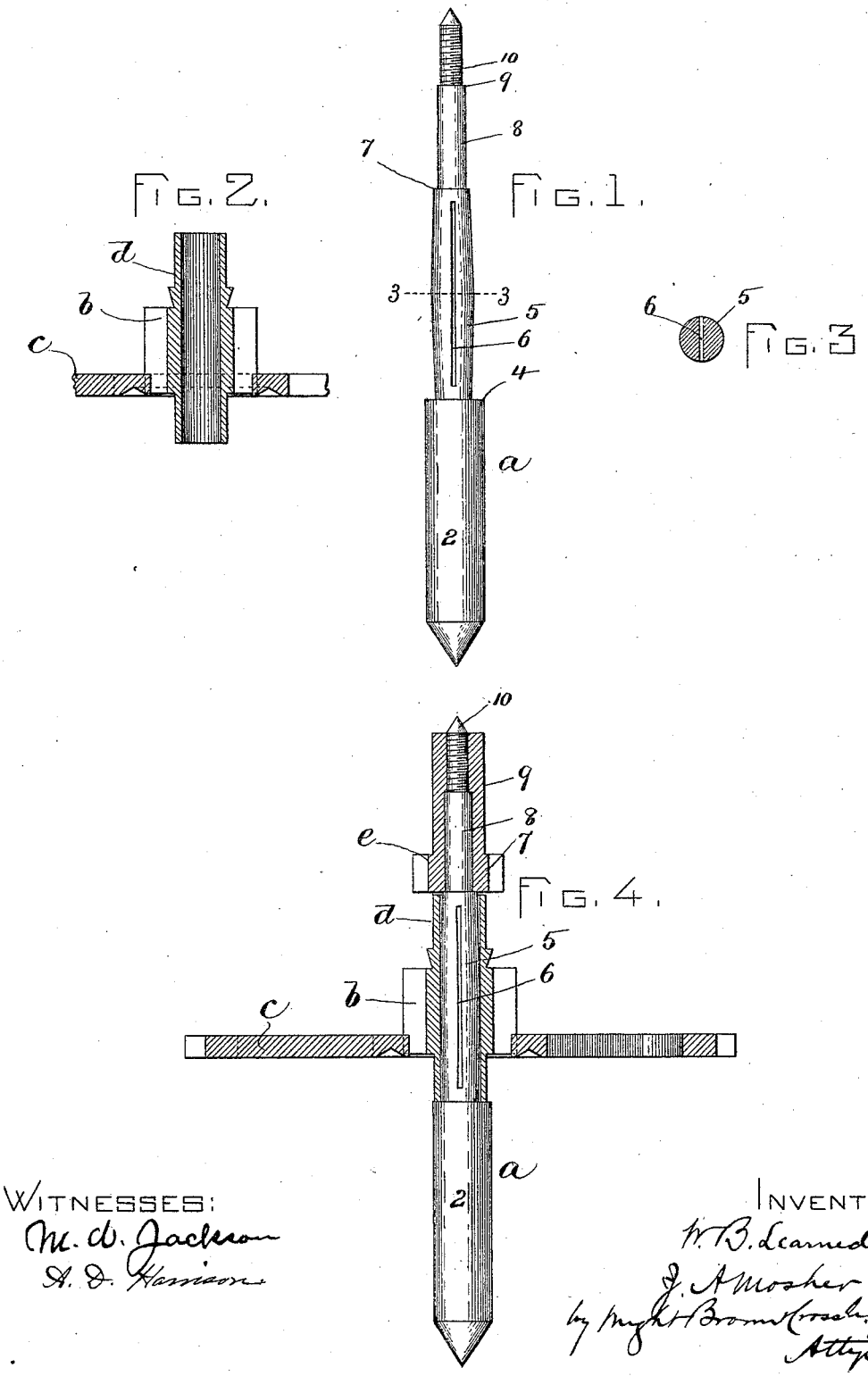
WITNESSES:
M. W. Jackson
A. D. Harrison
INVENTORS
W. B. Learned
J. A. Mosher
by Wright Brown Crossley
Attys

UNITED STATES PATENT OFFICE.

WILLIAM B. LEARNED AND JAMES A. MOSHER, OF BOSTON, MASSACHUSETTS, ASSIGNORS OF ONE-HALF TO THE E. HOWARD WATCH AND CLOCK COMPANY, OF SAME PLACE.

CENTER-ARBOR FOR WATCHES.

SPECIFICATION forming part of Letters Patent No. 530,345, dated December 4, 1894.

Application filed August 31, 1893. Serial No. 484,436. (No model.)

*To all whom it may concern:*

Be it known that we, WILLIAM B. LEARNED and JAMES ALLEN MOSHER, of Boston, in the county of Suffolk and State of Massachusetts, have invented certain new and useful Improvements in Center-Arbors for Watches, of which the following is a specification.

This invention has for its object to provide improved means for frictionally connecting the center wheel and pinion of a watch movement to the center arbor, and it consists in the improvements which we will now proceed to describe and claim.

Of the accompanying drawings forming a part of this specification: Figure 1 represents a side view of a center arbor constructed in accordance with our invention. Fig. 2 represents a sectional view of the center pinion and its sleeve, and a portion of the center wheel. Fig. 3 represents a section on line 3—3 of Fig. 1. Fig. 4 represents a view partly in section showing the arbor, the center wheel and pinion, and the cannon pinion.

The same letters of reference indicate the same parts in all the figures.

In carrying out our invention we make a center arbor $a$ comprising the enlarged end portion 2 terminating in a shoulder 4, the bearing 5 for the sleeve or hub of the center pinion $b$, said bearing terminating in a shoulder 7, the reduced portion 8 terminating in a shoulder 9, and the screw threaded end portion 10. The bearing 5 is tapered from its ends about to the center of its length so that said center has a larger diameter than other parts of the bearing. The bearing is provided with a longitudinal slot 6, which makes the bearing compressible, the parts of the bearing at opposite sides of the slots being converted into springs adapted to yield inwardly.

The center pinion $b$ and the center wheel $c$ are mounted on and rigidly affixed to a hub or sleeve $d$ which is internally bored to receive the bearing 5. The internal diameter of the sleeve $d$ at the point which bears on the enlarged portion of the bearing is slightly less than the diameter of said enlarged portion, so that when the sleeve is in place it will compress the bearing or force its sides inwardly, thus causing a frictional connection between the sleeve and bearing.

$e$ represents the cannon pinion which is internally recessed or formed to receive the reduced portion 8 and threaded portion 10 of the arbor, the cannon pinion being internally threaded to engage said threaded portion. When the cannon pinion is in place it bears on the shoulder 7.

Heretofore the most common form of frictional connection between the center pinion and the arbor has been through friction devices interposed between the end of the sleeve $d$ and the cannon pinion. The connection thus formed is not as reliable and efficient as our improved connection formed by the contact of the interior of the sleeve with the compressible bearing, said improved connection being entirely independent of the cannon pinion.

We claim—

A center arbor comprising an enlarged end portion terminating in a shoulder, a centrally enlarged, slotted compressible bearing terminating in a shoulder, a reduced portion terminating in a shoulder, and a screw threaded end portion above the shoulder, combined with a center wheel and its pinion, having a hub or sleeve formed to receive said bearing and having its internal diameter slightly less than that of the largest part of the bearing, so that when said sleeve is forced upon the said compressible bearing it will compress the latter and thus cause a frictional connection between the sleeve and arbor, and a cannon pinion internally recessed and threaded to receive the reduced portion and threaded portion of the arbor, said pinion bearing on the shoulder, the connection of the two pinions with the arbor being entirely independent of each other, as set forth.

In testimony whereof we have signed our names to this specification, in the presence of two subscribing witnesses, this 18th day of August, A. D. 1893.

WM. B. LEARNED.
JAMES A. MOSHER.

Witnesses:
C. F. BROWN,
ARTHUR W. CROSSLEY.